United States Patent [19]

Someya et al.

[11] Patent Number: 4,623,524
[45] Date of Patent: Nov. 18, 1986

[54] PROCESS AND APPARATUS FOR RECOVERING INERT GAS

[75] Inventors: Kazuo Someya; Osamu Kita, both of Kudamatsu; Masaomi Tomomura, Hitachi, all of Japan

[73] Assignee: Hitachi, Ltd., Tokyo, Japan

[21] Appl. No.: 699,543

[22] Filed: Feb. 8, 1985

[51] Int. Cl.⁴ .......................................... B01D 53/36
[52] U.S. Cl. ................................ 423/245; 423/262; 422/171; 422/172; 422/190
[58] Field of Search ............... 422/171, 172, 189, 190; 423/219, 230, 239, 245 R, 245 S, 246, 247, 262

[56] References Cited

U.S. PATENT DOCUMENTS

| 3,061,403 | 10/1962 | Rendos | 423/245 S |
| 3,469,934 | 9/1969 | Bocard et al. | 423/247 |
| 3,767,563 | 10/1973 | Woodle | 422/190 |

FOREIGN PATENT DOCUMENTS

| 2151816 | 4/1972 | Fed. Rep. of Germany | 423/262 |
| 3305299 | 8/1984 | Fed. Rep. of Germany | 423/246 |
| 72394 | 6/1977 | Japan | 423/245 R |
| 42548 | 10/1977 | Japan | 423/245 S |
| 120222 | 7/1984 | Japan | 423/247 |
| 202381 | 11/1984 | Japan | 423/262 |

Primary Examiner—David L. Lacey
Attorney, Agent, or Firm—Antonelli, Terry & Wands

[57] ABSTRACT

A process and apparatus for recovering a high-purity inert gas by removing the impurities in a used inert gas (e.g., Ar), comprising a combustible component reaction step and reaction unit for adding oxygen to a raw gas containing a carbonaceous combustible component to thereby react the combustible component in said raw gas with the oxygen; a carbon dioxide gas removing step and removing unit for removing the carbon dioxide in the raw gas sent from said combustible component reaction unit; an oxygen reaction step and reaction unit for adding hydrogen to the raw gas after the carbon dioxide gas removal to react the oxygen remaining in said raw gas with the hydrogen; a moisture removing step and removing unit for removing the moisture in the raw gas sent from the oxygen reaction unit; and a refining step and refining unit for removing the remaining impurities from the raw gas after the moisture removal to recover a high-purity inert gas.

17 Claims, 3 Drawing Figures

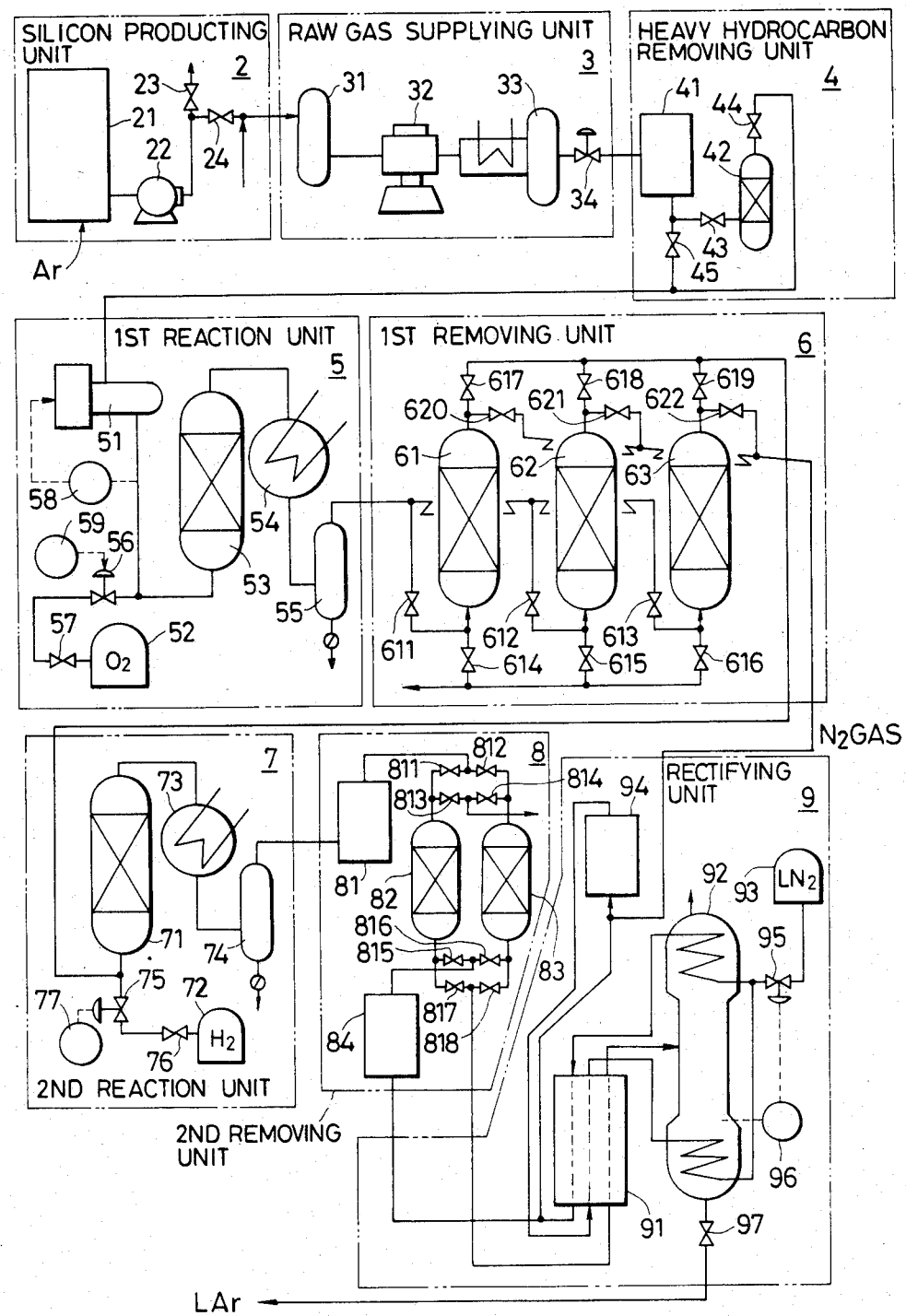

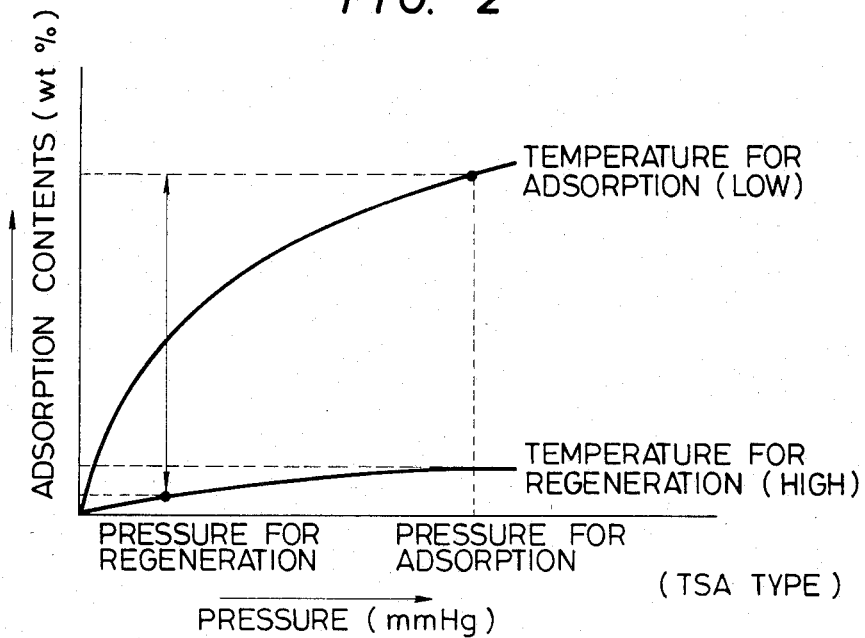
FIG. 2 (TSA TYPE)
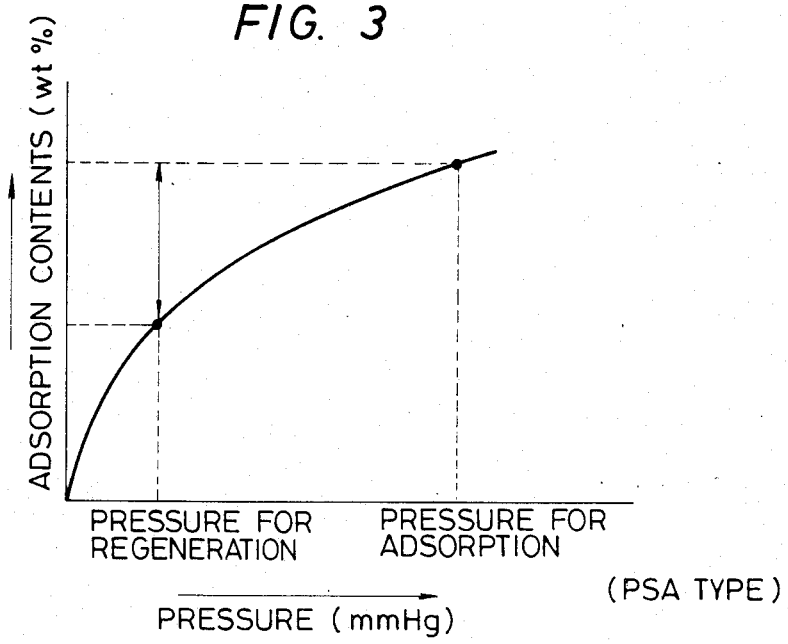
FIG. 3 (PSA TYPE)

PROCESS AND APPARATUS FOR RECOVERING INERT GAS

BACKGROUND OF THE INVENTION

1. Field of the Invention

The present invention relates to a process for recovering a high-purity inert gas by purifying a raw gas containing at least carbonaceous impurities and an inert gas in a high concentration and to an apparatus therefor.

2. Description of the Prior Art

Inert gas is frequently used as a protective gas or the like in, for example, metal refinement, hot treatment, welding, and the electronic industry. Recently, inert gas has been used as an ambient atmosphere in furnaces for producing semiconductor single crystals. An inert gas which is used in the production of semiconductor single crystals must have a very high purity in order to obtain high-purity semi-conductor single crystals.

An inert gas used as a protective gas or ambient atmosphere gas is inevitably contaminated with a large quantity of impurities according to its condition of use, so that the used inert gas can not be reused as such. In general, therefore, the used gas is exhausted (discharged) into the air.

Because the used inert gas contains a large quantity of precious inert gas besides a large amount of impurities, it is not economical to discharge the gas as such into the air. It is therefore resonable that the waste gas having a high concentration of an inert gas is used as a raw gas to recover a high-purity inert gas by removing the impurities from the raw gas.

Known methods for recovering such an inert gas include one disclosed in Japanese Patent Laid-Open No. 72394/1977.

This method comprises adding oxygen to a raw gas having a high inert gas (e.g., argon) concentration, leading the raw gas containing the oxygen to a first reaction tower packed with a metallic catalyst such as palladium or platinum, where the combustible component in the raw gas is reacted with oxygen; adding hydrogen to the gas leaving the first reaction tower; leading the raw gas containing hydrogen to a second reaction tower packed with a similar catalyst as above, wherein the oxygen in the raw gas is reacted with the added hydrogen; passing this raw gas through an adsorption tower to remove carbon dioxide and water in the gas by adsorption; and passing the gas leaving the adsorption tower through a low-temperature liquefaction/separation apparatus to separate and recover a high-purity inert gas (argon).

Conventional well-known processes can remove argon effectively without any problems when the carbonaceous combustible component content of a raw gas used in recovering an inert gas (e.g., waste gas having a high argon concentration) is low. However these processes have the problem that hydrocarbons remain in the recovered argon when the content of the carbonaceous combustible component in the raw gas is increased.

The problems encountered in the prior art will now be described specifically. Semiconductor single crystal producing furnaces where argon gas is used include those of an atmospheric pressure type in which argon gas is fed to a furnace at atmospheric pressure and those of a reduced pressure type in which argon gas is fed to a furnace evacuated to a vacuum or a reduced pressure, among which the latter are becoming predominant. Especially in case of a furnace of a reduced pressure type, a hydraulic rotary vacuum pump is used for pressure reduction and the raw gas discharged from such a pump contains a large quantity of a carbonaceous combustible component. Namely, in case of a reduced pressure type of furnace where a vacuum pump is used, the waste gas contains hydrocarbons, such as $CH_4$, in high concentrations as impurities, in addition to inorganic gases consisting mainly of $N_2$ and $O_2$. At the exit of the vacuum pump, the gas contains oil mist-containing heavy hydrocarbons in high concentrations in addition to light hydrocarbons.

An example of an analysis of the composition of a waste gas from a reduced pressure furnace is set forth below:

Analysis of the composition of a waste gas:
inorganic gases ($N_2$, $O_2$, etc.) = 2 mol %
light hydrocarbons ($CH_4$–$C_5$) = 12,000 ppm (in terms of $CH_4$)
heavy hydrocarbons ($C_6$–) = 20,000 ppm (in terms of $CH_4$)
argon gas (Ar) = the balance If oxygen is added to this gas (raw gas) and the combustible component is reacted with oxygen in a first reaction tower packed with a metallic catalyst, the temperature at the exit of the first reaction tower becomes extraordinary high. Further, the concentration of carbon dioxide ($CO_2$) formed from the reaction is increased. After the addition of hydrogen, the raw gas leaving the first reaction tower is led to a second reaction tower where $O_2$ and $H_2$ in the raw gas are allowed to react with each other. The $O_2$ can be converted into $H_2O$ by this reaction. However, because the raw gas leaving the first reaction tower contains a large quantity of $CO_2$ as described above, the following reactions, which can be neglected when the concentration of $CO_2$ in the raw gas is low, occur:

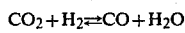

$$CO_2 + H_2 \rightleftarrows CO + H_2O$$

$$CO + 3H_2 \rightleftarrows CH_4 + H_2O.$$

Namely, a difficulty is brought about in that the $CO_2$ produced by the reaction in the first reaction tower reacts again with the hydrogen in the second reaction tower to produce hydrocarbons. The hydrocarbons produced in the second reaction tower are difficult to separate by adsorption, or remove by separation in the downstream adsorption tower or the low-temperature liquefaction/separation apparatus. Therefore, the hydrocarbons, which constitute part of the carbonaceous combustible component, remain in the recovered argon.

An example of an experiment will be set forth below: composition of a gas at the inlet of the second reaction tower:
$CO_2$ concentration; 1.2%
$H_2$ concentration; 3.4%
$O_2$ concentration; 1–1.4%
reaction temperature; 250°–350° C.

composition of a gas at the exit of the second reaction tower:
$CO_2$ concentration; 1.2%
$H_2$ concentration; 0.6–1.4%
$O_2$ concentration; $\leq$1 ppm
$CH_4$ concentration; 5–50 ppm Since the tolerable hydrocarbon concentration in argon gas used in a single crystal producing furance must be extremely low (e.g., 1 ppm or below), the argon, which is recovered with much effort, can not be used without further treatment.

Namely, the prior art is effective only when the content of a combustible component is low, and has a problem that impurities remain in the recovered inert gas (Ar in the above case) when the content of a combustible component is increased.

SUMMARY OF THE INVENTION

It is an object of the present invention to provide a process for recovering a high-purity inert gas from a raw gas containing at least a carbonaceous combustible component and an inert gas in a high concentration, and an aparatus therefor.

It is another object of the present invention to provide a process for recovering a high-purity inert gas consistently even when the above raw gas contains heavy hydrocarbons, and an apparatus therefor.

It is still aother object of the present invention to provide a process for recovering a high-purity inert gas economically from the above raw gas, and an apparatus therefor.

One embodiment of the present invention comprises a first reaction step of adding oxygen to a raw gas containing at least a carbonaceous combustible component and an inert gas in a high concentration to react the combustible component in said raw gas with the oxygen; a first removing step of removing carbon dioxide in the raw gas sent from said first reaction step; a second reaction step of adding hydrogen to the raw gas sent from said first removing step and reacting the remaining oxygen in said raw gas with said hydrogen; a second removing step of removing the moisture in the raw gas sent from said second reaction step; and a refining step of removing the remaining impurities from the raw gas sent from said second removing step and recovering said inert gas in a high purity.

Another embodiment of the present invention comprises a first reaction unit for reacting the combustible component in a raw gas containing the carbonaceous combustible component and a an inert gas in a high concentration with added oxygen; a first removing unit for removing carbon dioxide in the raw gas sent from said first reaction unit; a second reaction unit for reacting oxygen in the raw gas sent from said first removing unit with added hydrogen; a second removing unit for removing the moisture in the raw gas sent from said second reaction unit; and a refining unit for removing the impurities in the raw gas sent from said second removing unit to obtain said inert gas in a high purity.

Other objects and embodiments of the present invention will be obvious from the following description.

BRIEF DESCRIPTION OF THE DRAWINGS

FIG. 1 is a system flow diagram illustrating an example of the present invention.

FIG. 2 is a diagram illustrating the principle of a temperature swing type adsorption system.

FIG. 3 is a diagram illustrating the principle of a pressure swing type adsorption system.

DESCRIPTION OF THE PREFERRED EMBODIMENT

The present invention will now be described in detail with reference to a particular example.

FIG. 1 shows an example wherein a waste argon gas used in a reduced pressure silicon furnace is used as a raw gas and a high-purity argon is recovered from it.

Referring to FIG. 1, high-purity argon (Ar) is fed to a silicon furnace 21 in a silicon producing unit 2. A hydraulic rotary vacuum pump 22 reduces the pressure in the silicon furnace 21 to about 10 Torr. The waste gas containing a large quantity of argon discharged from the vacuum pump 22 is fed as a raw gas through a valve 24 to a raw gas supplying unit 3. A valve 23 is closed during recovering argon. The raw gas supplying unit 3 contains a gas holder 31, a compressor 32, a cooler 33, and a valve 34. Namely, the raw gas after flowing into the gas holder 31 is compressed to 2 to 6 kg/cm$^2$G by means of the compressor 32, cooled by means of the cooler 33 and led through the valve 34 to a heavy hydrocarbon removing unit 4. Since the raw gas in this example contains heavy hydrocarbon such as oil mist, the heavy hydrocarbon is removed in the unit 4. The heavy hydrocarbon removing unit 4 is composed of an oil mist separator 41 composed of a filter of gauze, glass wool or the like, an absorption tower 42 packed with an adsorbent such as active carbon or alumina gel, and valves 43–45. Usually the valve 45 is closed and the valves 43 and 44 are open. Therefore, the raw gas from which oil mist is removed by the oil mist separator 41 is sent through the valve 43 to the adsorption tower 42. In the adsorption tower 42, the heavy hydrocarbons in the raw gas are removed. The raw gas leaving the adsorption tower 42 is sent through the valve 44 to the subsequent first reaction unit 5, where the combustible component remaining in the raw gas is reacted (i.e., burned) with oxygen. Namely, the raw gas sent from the heavy hydrocarbon removing unit 4 is heated in a heater 51 to a temperature suitable for the reaction. A temperature controller 58 is provided for controlling this temperature most suitably. To this raw gas is added oxygen which is supplied from an oxygen holder 52 through valves 57 and 56. The oxygen is added to the raw gas in an amount necessary for complete combustion of the combustible component in the raw gas. Taking account of the fluctuation in the combustible component content in the raw gas, the amount of added oxygen must be somewhat larger than the minimum amount necessary for the complete combustion. An oxygen supply controller 59 controls the amount of the oxygen remaining in the raw gas on the effluent side of the reaction tower 53 so that it may be below a certain value. The raw gas after adding oxygen is led to the reaction tower 53 packed with a metallic catalyst such as palladium or platinum, wherein the combustible component is burned. In the reaction tower 53, the reaction of the combustible component with the oxygen (i.e., combustion of the combustible component) takes place, forming $CO_2$ and $H_2O$. Due to the heat of reaction generated thereby, the reaction tower 53 and the raw gas discharged therefrom are brought to high temperatures. The high-temperature raw gas is cooled by a cooler 54, and the moisture in the raw gas which is liquefied by this cooling is removed in a gas/liquid separator 55. The raw gas leaving the first reaction unit 5 contains a considerable amount (say, about 1.2%) of $CO_2$. When the raw gas still containing $CO_2$ is directly sent to the downstream second reaction unit 7, hydrocarbons such as $CH_4$ are re-formed by the reaction of $CO_2$ with $H_2$. In order to prevent this re-formation of hydrocarbons, the raw gas leaving the first reaction unit 5 is led to a first removing unit 6, where $CO_2$ in the raw gas is removed. The $CO_2$ removal can be carried out by any well-known means. Here, use is made of an adsorption/removing apparatus for removing the $CO_2$ in the raw gas by feeding the raw gas to an adsorption tower packed with an adsorbent such as molecular sieve or alumina gel, thereby allowing the adsorbent to adsorb the $CO_2$ in the raw gas. The adsorption/removing apparatuses of this type are broadly divided into temperature swing type adsorption apparatuses (TSA), in which the desorption of impurities adsorbed on an adsorbent in the adsorption tower is effected based on a temperature difference, and pressure swing type adsorption apparatuses (PSA), in which this desorption is effected based on a pressure difference. Both of these types may be used. FIG. 2 shows a diagram of the principle of TSA, and FIG. 3 shows a diagram of the principle of PSA. FIG. 1 is an example of a pressure swing type adsorption apparatus. The raw gas leaving the first reaction unit 5 is fed to any one of the adsorption towers 61, 62, and 63, where the $CO_2$ in the raw gas is chiefly adsorbed and removed. Each of the adsorption towers involves an adsorption process for removing impurities ($CO_2$ etc.) and a regeneration process for desorbing the adsorbed impurities to bring the adsorbent to a state in which it can readsorb impurities. Therefore, at least two adsorption towers and valves for switchover of these adsorption towers are necessary to continuously remove the $CO_2$ in the raw gas and continuously feed the raw gas to the downstream. In this example, three adsorption towers are provided to carry out the switch-over of these towers smoothly. Valves 611–622 are provided for the switchover of the adsorption towers. The raw gas from which $CO_2$ has been removed in the first removing unit 6 is fed to a second reaction unit 7, where the oxygen remaining in the raw gas is reacted with hydrogen to form water ($H_2O$). Namely, to the raw gas is added $H_2$ supplied from a hydrogen holder $H_2$ through the valves 76 and 75, and the raw gas containing the added $H_2$ is led to the reaction tower 71 packed with a metallic catalyst such as palladium or copper. In this reaction tower 71, the $O_2$ and $H_2$ in the raw gas react with each other to form $H_2O$. In order to remove the $O_2$ in the raw gas nearly completely, $H_2$ is supplied in a somewhat excessive amount. A hydrogen supply controller 77 regulates the amount of $H_2$ added so that the concentration of oxygen in the raw gas on the effluent side of the reaction tower 71 may be low (say, 1 ppm or below). Because the raw gas is brought to a high temperature by the reaction in the reaction tower 71, the raw gas is cooled by means of a cooler 73. The moisture in the raw gas liquefied by this cooling is removed in a gas/liquid separator 74. Since, however, the raw gas still contains a considerable amount of moisture, the raw gas leaving the second reaction unit 7 is led to the subsequent second removing unit 8, where the moisture in the raw gas is removed nearly completely. The second removing unit 8 is equipped with a refrigerator 81, adsorption towers 82 and 83 packed with an adsorbent such as molecular sieve or alumina gel, valves 811–818 for the switchover of the adsorption towers, and a heater 84 for heating a regenerating gas ($N_2$) used in the regeneration process of each adsorption tower. After being sent to the second removing unit 8, the raw gas is first cooled by the refrigerator 81 to a temperature suitable for the adsorbent to adsorb the moisture in the raw gas. The raw gas cooled by the refrigerator is led to one of the adsorption towers 82 and 83, where the moisture is adsorbed.

In this stage, the raw gas contains chiefly components Ar, $N_2$ and $H_2$, which are present in a quantitative relationship of $Ar>>N_2>H_2$. The raw gas leaving the second removing unit 8 is led to a rectifying unit 9, where Ar which is an inert gas to be recovered is separated and refined from the other impurities ($N_2$ and $H_2$). The rectifying unit 9 in this example is composed of a heat exchanger 91, a rectifying tower 92, a tank 93 for storing liquid nitrogen ($LN_2$) as cryogen, a compressor 94 for compressing nitrogen gas, a valve 95, a liquid level controller 96, and a valve 97. The raw gas sent from the unit 8 is cooled in the heat exchanger 91 to a low-temperature processing point and fed to the intermediate section of the rectifying tower 92. The raw gas fed to the rectifying tower 92 is rectified by the rectifying action of the tower into a high purity liquid argon (LAr) which is accumulated on the bottom and impurities consisting chiefly of $N_2$ and $H_2$ which are accumulated on the top. The liquid argon accumulated on the bottom of the rectifying tower 92 is withdrawn through the valve 97 and sent to a liquid argon storage tank (not shown). On the other hand, the impurity gas accumulated on the top of the rectifying tower 92 is heat-exchanged with the raw gas directly or through the heat exchanger 91 and then discharged into the air. Although Ar is recovered in the form of liquid argon is this example, it may be recovered in the form of gas. Namely, the high-purity liquid argon withdrawn from the bottom of the rectifying tower 92 may be gasified by raising its temperature by means of the heat exchanger 91. The $LN_2$ as the cryogen is deprived of its cold energy in the rectifying tower 92 and the heat exchanger 91 to recovert into normal-temperature $N_2$ gas. A portion of this gas is compressed in the compressor 94, cooled in the heat exchanger 91 to a low temperature processing point, and sent through the bottom of the rectifying tower 92 to the top, from which it is recirculated for effecting the rectification. The remainder $N_2$ gas is fed to the first removing unit 6 and the second removing unit 8. The $N_2$ gas fed to these units is used as a regenerating gas for each unit. In this way, it becomes unnecessary to supply externally a gas for regenerating the adsorbent in each adsorption tower or it becomes possible to decrease the amount of external supply, which is economically advantageous.

Description will now be made of a specific embodiment in practicing the present invention.

EMBODIMENT

A waste gas comprising argon used as an inert gas in a silicon furnace was used as a raw gas. It contained 32,000 ppm (in terms of methane) of hydrocarbons (including 20,000 ppm of heavy hydrocarbon) and the rate of the raw gas was 100 $Nm^3/h$.

The heavy hydrocarbons in the raw gas were removed in the heavy hydrocarbon removing unit 4. Therefore, the hydrocarbon content of the raw gas was reduced to 12,000 ppm (in terms of methane) in this stage. The quantity of hydrocarbons in the raw gas amounted to 1.2 $Nm^3/h$ ($=100\times0.012$) in terms of methane. If the reaction of methane with oxygen follows the following reaction:

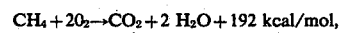

$$CH_4 + 2O_2 \rightarrow CO_2 + 2H_2O + 192 \text{ kcal/mol,}$$

the quantity of the heat generated in the reaction tower 53 is estimated as $1.2/22.4\times192,000=10290$ kcal/h.

When a value of 0.222 $kcal/Nm^3 °C$. is assumed as the specific heat of argon, the temperature increase of the catalyst in the reaction tower 53 is $10290/100\times0.222=463°$ C. When the inlet temperature of the reaction tower 53 is 200° C., the exit temperature of the reaction tower 53 is 663° C. (=200+463). The hydrocarbon in the raw gas was burned completely by the addition of $O_2$, and $CO_2$ was removed in the first removing unit 6. The raw gas in this stage was in the following state:

raw gas rate; 100 $Nm^3/h$
excessive $O_2$ concentration; 1%
excessive $O_2$ quantity; $100 \times 0.01 = 1$ $Nm^3/h$.

The reaction in the second reaction unit 7, where hydrogen was added to the raw gas fed from the first removing unit to react with the oxygen in the raw gas was as follows:

$$H_2 + \tfrac{1}{2}O_2 \rightarrow H_2O + 58 \text{ kcal/mol.}$$

From this, it follows that the quantity of the heat generated in the catalyst tower 71 in the second reaction unit 7 is $2.0/22.4 \times 58,000 = 5,180$ kcal/h, and that the temperature increase in the catalyst is $5,180/100 \times 0.222 = 233°$ C. When the gas temperature at the inlet of the reaction tower 71 is 40° C., the temperature of the raw gas at the exit of the reaction tower 71 is 273° C. (=40+233). The raw gas was then cooled by means of a water cooler 73. In the second removing unit 8, the moisture in the raw gas was removed nearly completely. In this stage, the impurity in the raw gas consisted chiefly of $N_2$ and $H_2$. In the refining unit 9, the raw gas was separated into Ar and impurites, and the former was recovered.

According to one embodiment of the present invention, it is possible, as described above, to decrease markedly the content of the hydrocarbon in the raw gas and the amount of the catalyst used in the first reaction unit 5 by placing the heavy hydrocarbon removing unit 4 on the upstream side of the first reaction unit 5. Further, it becomes possible to lower the reaction temperature in the reaction tower 53 to 700° C. or below, which eliminates problems such as deactivation of catalyst. Because the raw gas is fed to the second reaction unit 7 after the $CO_2$ in the raw gas is previously removed by placing the first removing unit 6 between the first reaction unit 5 and the second reaction unit 7, the formation of hydrocarbons can be prevented and the purity of the recovered argon can be improved.

It is possible to establish an economically advantageous system by using the $N_2$ used in the refining unit 9 directly as a regenerating gas for each of the first and second removing units.

Although the present invention has been described with reference to the above embodiment wherein high-purity argon is recovered from used impure argon gas to which the present invention can be applied most suitably, it should be noted that the present invention is by no means limited to this embodiment but can be applied to recover other inert gases.

We claim:

1. A process for recovering an inert gas, comprising:
    a first reaction step of adding an amount of oxygen to a raw gas containing at least a carbonaceous combustible component and an inert gas in a high concentration to react the combustible component in said raw gas thereby forming a first gaseous product containing the inert gas, carbon dioxide and moisture, said amount of oxygen being larger than the minimum amount needed for complete combustion of the carbonaceous combustible component;
    a first removing step of removing at least said carbon dioxide in the first gaseous product formed in said first reaction step;
    a second reaction step of adding an amount of hydrogen to the first gaseous product remaining after said first removing step to react the oxygen remaining in said first gaseous product with said hydrogen thereby forming a second gaseous product containing said inert gas and moisture, said amount of hydrogen being larger than the minimum amount needed to completely react said oxygen remaining in said first gaseous product;
    a second removing step of removing the moisture in the second gaseous product which is obtained from said second reaction step; and
    a refining step of removing remaining impurities, including hydrogen, from the second gaseous product remaining after said second removing step and recovering said inert gas.

2. A process for recovering an inert gas according to claim 1, wherein the raw gas fed to said first reaction step is a used inert gas which has previously passed through a step of removing heavy hydrocarbons.

3. A process for recovering an inert gas according to claim 1, wherein the removal of carbon dioxide in said first removing step is carried out by passing the first gaseous product formed in said first reaction step through an adsorption tower packed with an adsorbent.

4. A process for recovering an inert gas according to claim 3, wherein said adsorption tower is packed with the adsorbent and further comprising a regenerating step for regenerating the adsorbent in the adsorption tower by feeding a regenerating gas to the adsorption tower.

5. A process for recovering an inert gas according to claim 4, wherein said refining step is carried out by a low temperature separation process and a portion of the gas used as cryogen in said low-temperature separation process is used as the regenerating gas for said adsorption tower.

6. A process for recovering an inert gas according to claim 1, wherein said first removing step comprises removing the moisture in the first gaseous product produced in said first reaction step and removing the carbon dioxide in the first gaseous product after removing the moisture.

7. A process for recovering an inert gas according to claim 1, wherein each of said first and second reaction steps is performed in a reactor packed with a catalyst.

8. An apparatus for recovering an inert gas comprising:
    a first reaction unit comprising means for adding an amount of oxygen to a raw gas containing at least a carbonaceous combustible component and an inert gas in a high concentration, said amount of oxygen being larger than the minimum amount needed for complete combustion of the carbonaceous combustible component, and reactor means for reacting said carbonaceous combustible component with the oxygen to thereby produce a first gaseous product containing inert gas, carbon dioxide and moisture;
    a first removing unit comprising means for removing at least the carbon dioxide in the first gaseous product formed in said first reaction unit;
    means for feeding said first gaseous product from said first reaction unit to said first removing unit;

a second reaction unit comprising means for adding an amount of hydrogen to the first gaseous product remaining after said first removing unit, said amount of hydrogen being larger than the minimum amount needed to completely react said oxygen remaining in said first gaseous product, and means for reacting the oxygen remaining in said raw gas with said hydrogen to thereby produce a second gaseous product containing said inert gas and moisture;

means for feeding said first gaseous product from said first removing unit to said second reaction unit;

a second removing unit comprising means for removing the moisture in the second gaseous product which is formed in said second reaction unit;

means for feeding said second gaseous product from said second reaction unit to said second removing unit;

a refining unit comprising means for removing remaining impurities, including hydrogen, in the second gaseous product remaining after said second removing unit to thereby obtain said inert gas in a high purity; and means for feeding said second gaseous product from said second removing unit to said refining unit.

9. An apparatus for recovering an inert gas according to claim 8, wherein said means for removing at least the carbon dioxide in the first gaseous product formed in said first reaction unit comprises an adsorption/removing apparatus comprising:

a plurality of adsorption towers packed with adsorbent for adsorbing carbon dioxide;

means for feeding the first gaseous product formed in said first reaction unit into one of the plurality of adsorption towers; and means for feeding regenerating gas for regenerating the adsorbent into the others of the plurality of adsorption towers.

10. An apparatus for recovering an inert gas according to claim 8, wherein said refining unit comprises a low-temperature separation apparatus.

11. An apparatus for recovering an inert gas according to claim 9, wherein said refining unit comprises a low-temperature separation apparatus including nitrogen as a cryogen in said low-temperature separation apparatus.

12. An apparatus for recovering an inert gas according to claim 11, wherein said means for feeding regenerating gas comprises a feeding conduit positioned and arranged to feed a portion of the nitrogen used as the cryogen of the low-temperature separation apparatus to said others of the plurality of adsorption towers.

13. An apparatus for recovering an inert gas according to claim 8, wherein said second removing unit comprises an adsorption/removing apparatus comprising:

a plurality of adsorption towers packed with adsorbent for adsorbing moisture;

means for feeding the second gaseous product formed in said second reaction unit into one of the plurality of moisture adsorption towers; and means for feeding a regenerating gas for regenerating the moisture adsorbent into the others of the plurality of adsorption towers.

14. An apparatus for recovering an inert gas according to claim 9, wherein said refining unit comprises a low-temperature separation apparatus.

15. An apparatus for recovering an inert gas according to claim 8, wherein each of said first and second reaction units comprises a reactor packed with a catalyst.

16. A process for recovering an inert gas, comprising:

a step of removing heavy hydrocarbons in a raw gas containing at least carbonaceous combustible components and an inert gas in a high concentration;

a step of heating the raw gas remaining after removal of the heavy hydrocarbons to produce a heated raw gas;

a first reaction step of adding an amount of oxygen to the heated raw gas to react the combustible component in said raw gas thereby forming a first gaseous product containing inert gas, carbon dioxide and moisture, said amount of oxygen being larger than the minimum amount needed for complete combustion of the carbonaceous combustible component;

a first moisture removing step of removing the moisture in the first gaseous product produced in the first reaction step;

a carbon dioxide removing step of removing the carbon dioxide in the first gaseous product remaining after the first moisture removing step;

a second reaction step of adding an amount of hydrogen to the first gaseous product remaining after said carbon dioxide removing step to react the oxygen remaining in the first gaseous product with said hydrogen thereby forming a second gaseous product containing inert gas and moisture, said amount of hydrogen being larger than the minimum amount needed to completely react said oxygen remaining in the first gaseous product;

a second moisture removing step of removing the moisture in the second gaseous product produced in the second reaction step; and an inert gas refining step of removing remaining impurities, including hydrogen, in the second gaseous product remaining after the second moisture removing step and recovering said inert gas.

17. An apparatus for recovering an inert gas, comprising:

a heavy hydrocarbon removing unit comprising means for removing heavy hydrocarbons in a raw gas containing at least carbonaceous combustible components and an inert gas in a high concentration;

a first reaction unit comprising means for adding an amount of oxygen to the raw gas remaining after said heavy hydrocarbon removing unit, said amount of oxygen being larger than the minimum amount needed for complete combustion of the carbonaceous combustible component, and reactor means for reacting said carbonaceous combustible component with the oxygen to thereby produce a first gaseous product containing inert gas, carbon dioxide and moisture;

means for feeding said raw gas from said heavy hydrocarbon removing unit to said first reaction unit;

a first removing unit comprising means for removing the carbon dioxide and the moisture in the first gaseous product produced in said first reaction unit;

means for feeding said first gaseous product from said first reaction unit to said first removing unit;

a second reaction unit comprising means for adding an amount of hydrogen to the first gaseous product remaining after said first removing unit, said amount of hydrogen being larger then the minimum amount needed to completely react said oxygen remaining in said first gaseous product, and means for reacting the oxygen remaining in said first gaseous product with said hydrogen to thereby produce a second gaseous product containing inert gas and moisture;

means for feeding said the first gaseous product from said first removing unit to said second reaction unit;

a second removing unit comprising means for removing the moisture in the second gaseous product produced in said second reaction unit;

means for feeding said second gaseous product from said second reaction unit to said second removing unit;

a refining unit comprising means for removing remaining impurities, including hydrogen, in the second gaseous product remaining after said second removing unit to thereby obtain said inert gas in a high purity; and means for feeding the second gaseous product from said second removing unit to said refining unit.

* * * * *